Aug. 6, 1968   C. O. LEYDIG ETAL   3,395,520
TREE TOPPING MACHINE

Filed Oct. 18, 1965   4 Sheets-Sheet 1

INVENTORS
CLYDE O. LEYDIG
MELVIN O. LANGFORD
BY
William R. Piper
ATTORNEY

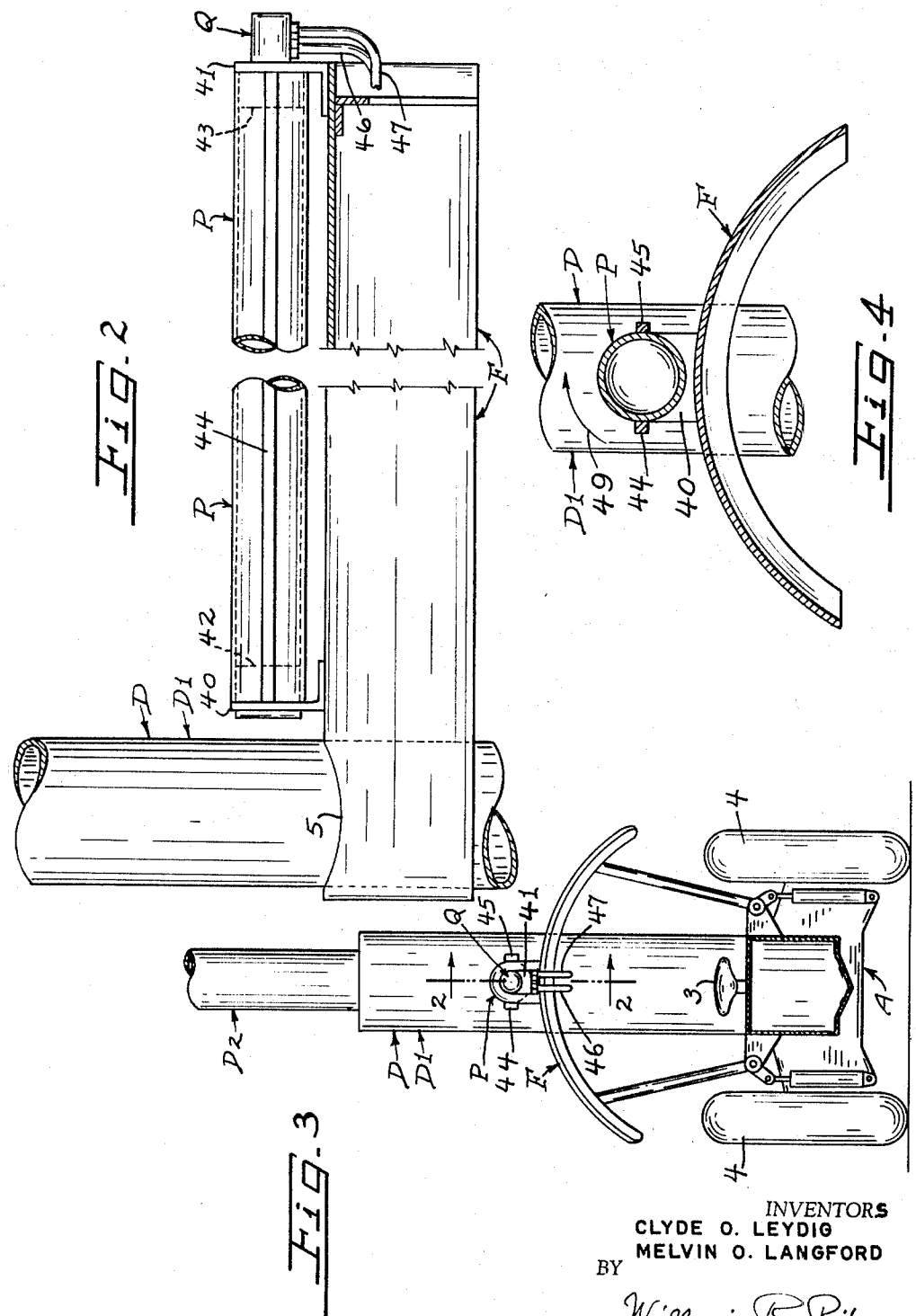

Aug. 6, 1968   C. O. LEYDIG ETAL   3,395,520
TREE TOPPING MACHINE
Filed Oct. 18, 1965   4 Sheets-Sheet 3
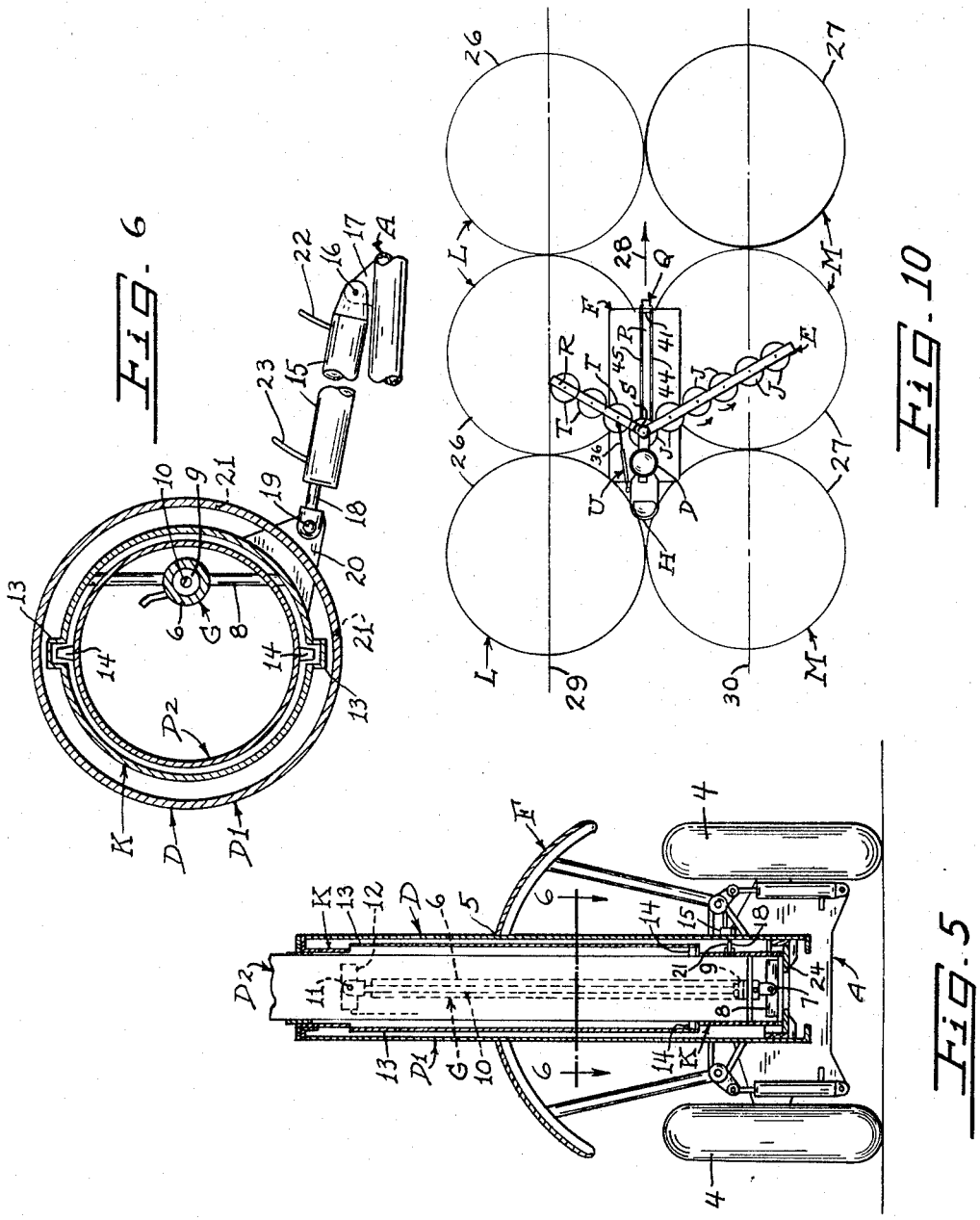
INVENTORS
CLYDE O. LEYDIG
MELVIN O. LANGFORD
BY
William R. Piper
ATTORNEY

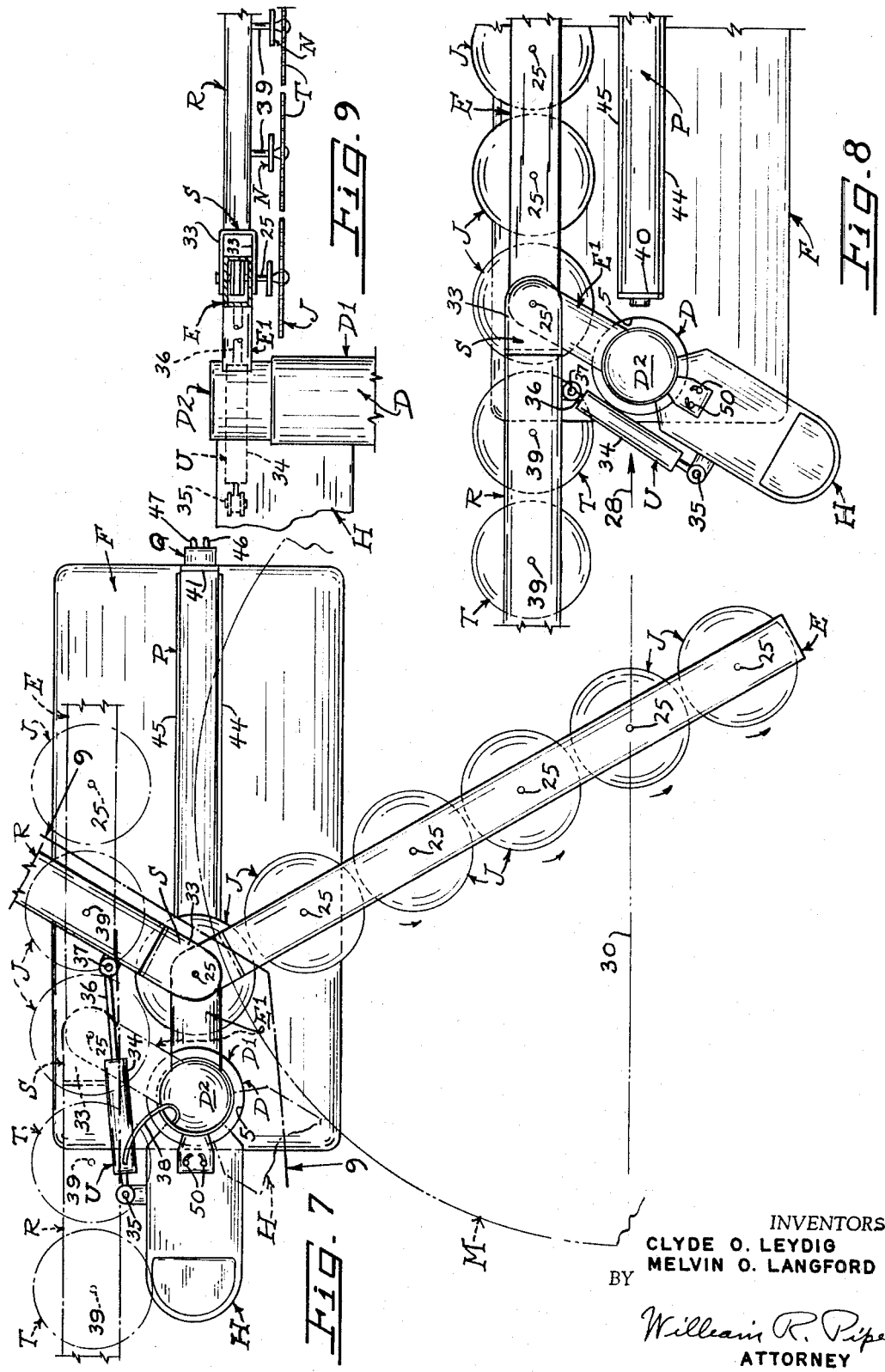

United States Patent Office 3,395,520
Patented Aug. 6, 1968

3,395,520
TREE TOPPING MACHINE
Clyde O. Leydig and Melvin O. Langford, both of
P.O. Box 272, Exeter, Calif. 93221
Filed Oct. 18, 1965, Ser. No. 496,779
7 Claims. (Cl. 56—235)

The present invention relates to improvements in a tree topping machine with main and clean up disc saw carrying booms and roll bar hood cleaner, and it consists in the combination, construction and arrangement of parts as hereinafter described and claimed.

Our invention pertains to a tractor operated tree topping machine that has an extensible telescoping tower with a radially-extending, disc saw-carrying main boom at its top. The boom can be swung from a position paralleling the length of the tractor into an angular position after the telescoping tower has raised the boom to the desired height for topping the trees. The boom carries a plurality of disc saws arranged in a row on its underside. The tractor is driven down the center of two parallel rows of trees after the main boom has been swung into an angular position with respect to the tractor so that its outer end extends beyond the line of centers of one of the tree rows so that the disc saws will top these trees up to points just beyond the tree centers. Beaters are associated with the disc saws and propel the material, cut by the saws, toward the tractor.

We have found that some of the material cut by the main boom tends to bear against adjacent portions of the trees and to weight down the tops of the branches and bend them slightly so that a proper height cut is not made. These bent branches will straighten up after the passing over of the main boom and the cut material has been removed and the branches will project higher than desired.

To overcome this difficulty we have provided a clean-up saw-carrying boom that can be swung independently with respect to the main boom so as to extend over to the row of trees that have already been cut and paralleling the row being cut. This clean-up boom will top off branches that extend above the plane of the disc saws carried by the clean-up boom.

We provide an arcuate cover or hood for the tractor engine and for the operator, this cover extending throughout the length of the tractor so as to protect both operator and engine from material that is cut from the trees. The telescoping tower is positioned at the rear of the cover and tractor and extends above it. The rotation of the disc saws and the beaters on both the main and clean-up booms will propel some of the cut material toward the top of the cover. This material has a tendency to slide back on the cover and to pile up in front of the tower as the tractor moves forwardly. After this material piles up to a certain height, it falls off in a large pile and this is objectionable because the pile must be disposed of in some way.

A further object of our invention is to provide means on top of the arcuate tractor cover that will remove any material from the cover that falls on it. This material removing means is in the form of a rotating roll bar or cylinder that preferably extends the full length of the arcuate tractor cover and is spaced above it. The constantly rotating roll bar will remove material from the cover top as fast as it accumulates and this material will drop onto the ground along the sides of the moving tractor where it may be later broken up into small pieces and left on the ground for fertilizing it. In case of an unusual circumstance where some of the material might jamb between the roll bar and the top of the arcuate cover, the operator can reverse the rotation of the roll bar for freeing the jamb.

Both the main and clean-up booms can be swung into positions paralleling the length of the tractor when it is desired to transport the tractor from one place to another. Neither boom will extend beyond the sides of the tractor when they are in this position.

Other objects and advantages will appear as the specification continues. The novel features of the invention will be set forth in the appended claims.

DRAWINGS

For a better understanding of our invention, reference should be made to the accompanying drawings, forming part of this specification, in which:

FIGURE 2 is an enlarged side elevation of the roll bar and shows the cover or hood partly in section as is indicated by the section line 2—2 of FIGURE 3.

FIGURE 3 is a front elevation of the roll bar and the tractor cover and illustrates a transverse section through the tractor as indicated by the section line 3—3 in FIGURE 1.

FIGURE 4 is a transverse section through the tractor cover and roll bar and is shown substantially on the same scale as FIGURE 2. FIGURE 4 is a section along the line 4—4 of FIGURE 1.

FIGURE 5 is a vertical section through the telescoping tower and supporting mechanism and is taken along the line 5—5 of FIGURE 1.

FIGURE 6 is an enlarged horizontal section through the telescoping tower and is taken along the line 6—6 of FIGURE 5.

FIGURE 7 is a top plan view of FIGURE 1 and shows both the main and clean-up booms in operative positions by full lines and in travelling positions by dot-dash lines.

FIGURE 8 is a top plan view similar to FIGURE 7 but shows both the main and clean-up booms in the travelling position.

FIGURE 9 is an elevational view of FIGURE 8, when looking in the direction of the arrows 9—9 of FIGURE 8.

FIGURE 10 is a schematic top plan view showing our device topping a row of trees with the main boom topping one row of trees up to a point just beyond the centers of the trees and the clean-up boom trimming any over-extending branches on the opposite parallel row of trees.

Figure 1:
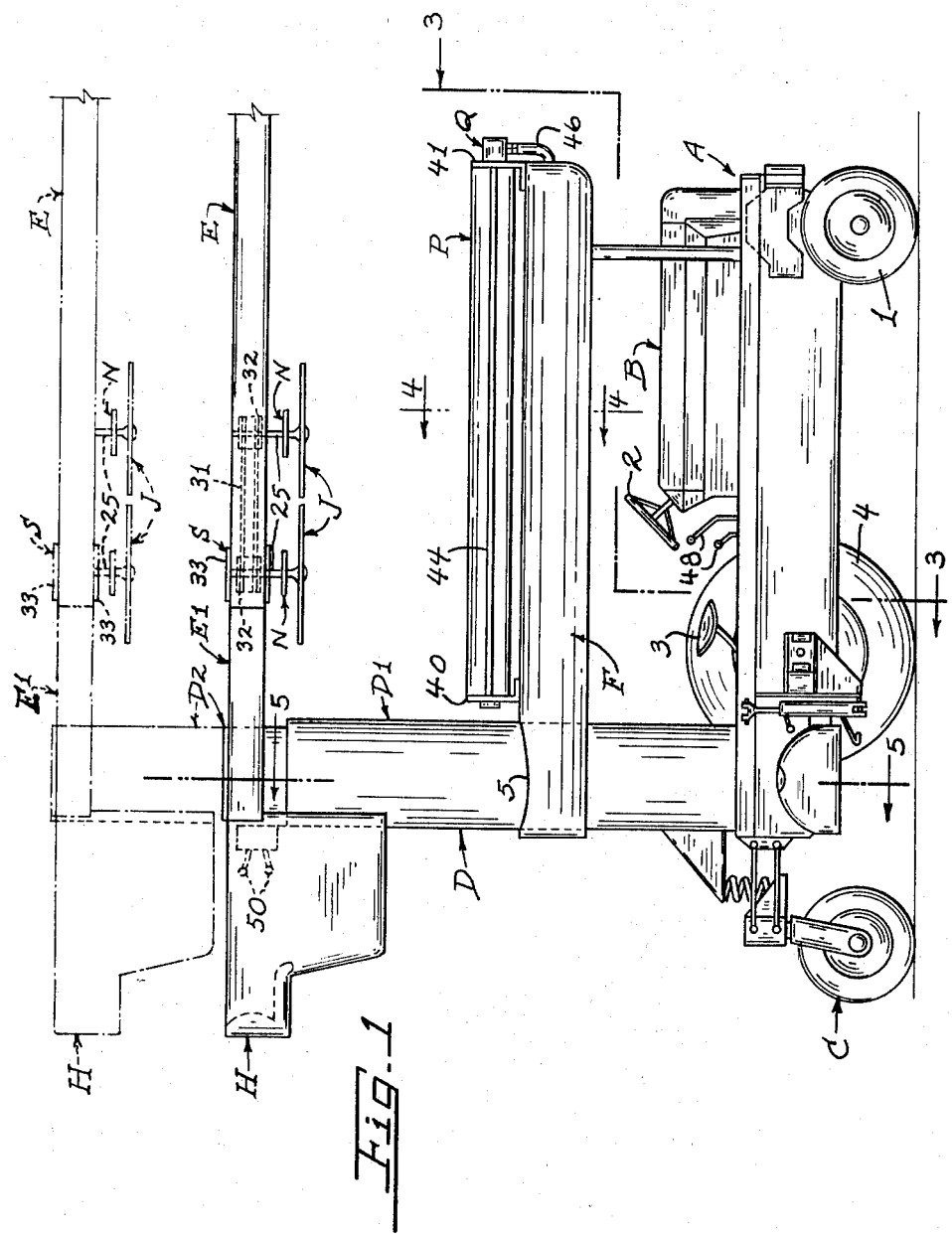
FIGURE 1 is a side elevation of the tree topper and shows our roll bar hood cleaner rotatably mounted above the arcuate tractor cover.

While we have shown only the preferred form of our invention, it should be understood that various changes, or modifications, may be made within the scope of the annexed claims without departing from the spirit thereof.

DETAILED DESCRIPTION

In carrying out our invention, we show a tractor indicated generally at A in FIGURE 1. This tractor may be of any type desired and it includes a tractor engine B, steerable front wheels 1 and a steering wheel 2. A seat 3 is provided for the operator of the tractor. Rear drive wheels are indicated at 4 and a castor wheel C with associate mechanism is shown at the rear of the tractor and is for the purpose of preventing the tractor from overturning rearwardly.

The tractor has a telescoping tower indicated generally at D and this tower is of the same type as shown in the copending application of Clyde O. Leydig and Yigal Michelson on a Tree Topper With Telescoping Tower and Oscillating Boom, Ser. No. 305,436, filed Aug. 29, 1963 now Patent No. 3,214,895. The tower D comprises an outer cylindrical member D1 and a telescoping inner cylindrical member D2 that can be raised or lowered for raising or lowering a saw carrying main boom indicated at E.

Any means for raising or lowering the inner telescoping cylindrical member D2 within the upwardly extending outer cylindrical member D1, may be used. The mechanism illustrated in FIGURE 3 of the copending application, Ser. No. 305,436, is used for raising or lowering the inner cylindrical member D2. In FIGURE 5, we show a cross-section through the telescoping tower D and it will be noted that the outer cylinder D1 is supported by the tractor body A and extends through an opening 5 in a tractor cover or hood F, this cover being arcuate in cross-section. The inner cylindrical telescoping member D2 slides within the outer cylindrical member D1 and is raised or lowered by a hydraulic mechanism indicated generally by G.

The hydraulic mechanism includes a vertically extending cylinder 6 that has its lower end pivotally mounted at 7 on a supporting block 8. A piston 9 is slidably mounted in the cylinder 6 and a piston rod 10 projects upwardly from the piston and extends through the top of the hydraulic cylinder 6. The upper end of the piston rod is pivotally mounted at 11 to a top cross-piece 12 that is connected to the inner telescoping cylindrical member D2.

The tractor operator while sitting on the tractor seat 3 has control units 48 for delivering fluid under pressure into the cylinder 6 and below the piston 9 for raising the piston. As the piston is moved upwardly in the hydraulic cylinder 6, it will lift the inner cylindrical member D2 into the dot-dash line position indicated in FIGURE 1.

When the operator wishes the inner telescoping cylindrical member D2 to move downwardly in the outer cylindrical member D1, he merely actuates the control lever 48 for causing hydraulic fluid to enter the top of the cylinder 6 for moving the piston 9 downwardly in the cylinder. The inner cylindrical member D2 will be moved downwardly and will lower the main boom E.

FIGURE 7 shows the top plan view of the saw carrying main boom E and this boom is angle-shaped and extends from the top of the inner telescoping cylindrical member D2. A main boom operator's seat is shown at H and this is mounted at the same level as the boom E and is carried by the top of the inner cylindrical member D2. Since the operator's seat H is at the same level as the main boom, this permits the operator to watch the operation of the disc saws J carried by this boom. When the operator swings the main boom E, the operator's seat H will swing with it as indicated by the dot-dash line position shown in FIGURE 7. There is a second set of controls 50 associated with the main boom operator's seat H, see also FIGURE 1, and this set of controls duplicates the set that is placed in front of the seat 3 to be manipulated by the tractor operator who occupies this seat. The purpose for the second set of controls for the operator's seat H is to permit the main boom operator to control all movements of the boom E and associate mechanisms because the operator in this seat has a better view.

Before describing the main boom in any further detail, it is best to describe the means for swinging it into operative position. The inner cylindrical member D2 can be rotated with respect to the outer cylindrical member D1 for the purpose of swinging the main boom E from the dot-dash line position shown in FIGURE 7 into the full line position. When the boom E is not being used for topping trees, the operator swings it into a line paralleling and just to the left of the longitudinal axis of the tractor so that the boom and disc saws J will not interfere with transporting the tractor from place to place. The operator can swing the boom E into the angular full line position shown in FIGURE 7 or into any other desired angular position between its limits of swing for the purpose of causing the disc saws J to top the trees in a manner hereinafter described. Any means for rotating the inner telescoping cylindrical member D2 within the outer cylindrical member D1 for swinging the boom E into the desired angular position with respect to the tractor A may be used.

We have shown one mechanism for accomplishing this. In FIGURES 5 and 6, we show the inner telescoping cylindrical member D2 sliding vertically within a vertically extending intermediate sleeve K and this sleeve is disposed within the outer cylindrical member D1 and encloses the inner telescoping cylindrical member D2. The intermediate sleeve K has a pair of vertical guideways 13, see FIGURE 6, and the inner cylindrical member D2 has keys 14 that slide in the vertical guideways. The sleeve K can be rotated and it will rotate the inner telescoping cylindrical member D2 with it and will not interfere with the vertical movement of the inner cylindrical member.

The lower block 8 or cross piece is carried by the intermediate sleeve K at the lower end of the sleeve. This construction permits the lower cross-piece 8 to rotate with the intermediate sleeve K and will cause the hydraulic cylinder 6 to also rotate with the sleeve. The result is that the intermediate sleeve K and the inner telescoping cylindrical member D2 can be rotated within the outer cylindrical member D1 without interfering with the vertical lifting movement of the inner cylindrical member D2 with respect to the outer cylindrical member D1.

The particular rotating means for the sleeve K is shown in FIGURE 6. A hydraulic cylinder 15 has one end pivotally secured at 16 to a bracket 17 and the bracket is attached to the tractor frame A. A piston, not shown, slides within the cylinder 15 and it has a piston rod 18 that projects from the end of the cylinder opposite to the pivoted support 16. The piston rod 18 is pivotally connected at 19 to a bracket 20 and this bracket is attached to the intermediate sleeve K. The bracket extends through a slot 21 provided in the outer cylinder member D1. A pair of conduits 22 and 23 communicate with opposite ends of the cylinder 15 and when fluid is admitted into the cylinder by means of the conduit 22, the piston will be moved and will cause the piston rod 18 to act on the bracket 20 for rotating the sleeve K in a clockwise direction when looking at FIGURE 6.

When fluid is admitted into the opposite end of the cylinder 16 by means of the conduit 23, the piston will be reversed in its movement and will cause the piston rod 18 and bracket 20 to rotate the sleeve K in a counterclockwise direction. The controls for admitting fluid to either of the conduits 22 and 23 may be placed adjacent to the driver's seat 3 of the tractor and are indicated generally at 48. A duplicate set of controls 50 are placed adjacent to the operator's seat H for operating the main boom E.

When the intermediate sleeve K is rotated in either direction, it will rotate the keys 14 which in turn will rotate the inner telescoping cylindrical member D2. A rotation of this member will swing the disc saw-carrying main boom E in the desired direction. FIGURE 5 shows the lower end of the intermediate sleeve K resting on a supporting plate 24 and this plate permits the rotation of the sleeve. The inner telescoping cylindrical member D2 is supported by the hydraulic cylinder 6, piston 9 and piston rod 10.

The main disc saw-carrying boom E is angle shaped as clearly shown in FIGURES 7 and 8. This boom has a short portion E1 that extends radially from and is supported by the inner telescoping cylinder D2, near its top. When the main boom E is in operative position as shown by the full lines in FIGURE 7, the short boom portion E1 will extend directly forwardly from the telescoping cylinder D2, and will parallel the longitudinal axis of the tractor A. The axis of the first disc saw J will lie in a vertical plane that extends through the longitudinal axis of the tractor. From this point the remaining portion of the main boom E will extend at an angle so that the saws J, carried by this portion of the boom will top a tree indicated by the dash double dot circle M, shown in FIGURE 7. The disc saws J on the main boom E will top the tree M to a point just beyond the center line 30 of the tree.

In FIGURES 7 and 8, we show the plurality of disc saws J as being six in number although we do not wish to be confined to any particular number. The saws are supported by shafts 25 and these shafts extend in a vertical direction and parallel to each other and are supported in bearings, not shown, that in turn are carried by the boom E. The shafts 25 are arranged in a row.

The disc saws J may be of any diameter desired and we are using saws about three feet in diameter. The peripheries of the saws are spaced a slight distance from each other as shown in FIGURES 7 and 8. The length of the angular portion of the boom E is such that it will extend over the adjacent row of trees M that are to be topped, see the diagrammatic showing in FIGURE 10. In this figure there are two rows of trees indicated at L and M. The outer diameters of the trees are indicated by the circles 26 for the row L and the circles 27 for the row M. The circumferences of the circles 26 are substantially tangent to the circumferences of the circles 27.

A disc saw carrying clean up boom R is shown in FIGURES 7, 8 and 9. A bracket S is U-shaped and has its two arms 33, straddling the top and bottom of the main boom E and pivotally connected to the shaft 25 for the first disc saw J that lies at the outer end of the short portion E1 of the main boom. The bracket S supports the inner end of the clean up boom R. FIGURE 10 shows the clean up boom R as carrying three disc saws T, mounted on shafts 39, although we do not wish to be limited to any exact number.

Hydraulic means indicated generally at U, is used for swinging the clean up boom R, from operative position shown in FIGURES 7 and 10 into inoperative position shown by the dot dash lines in FIGURE 7 and in full lines in FIGURE 8. This hydraulic means U comprises a hydraulic cylinder 34 that has one end pivotally secured at 35 to the operator's seat H. A piston rod 36 extends from the cylinder and has a piston, not shown, slidably mounted in the cylinder. The piston rod 36 has its outer end pivoted at 37 to the clean up boom R. FIGURE 7 shows one hydraulic hose 38 leading from an end of the cylinder 34 to the set of control levers 50 positioned in front of the operator's seat H. There would be two hydraulic hoses and one or two levers in the set 50 would control the flow of fluid to and from the cylinder 34 for moving the piston rod 36 in the desired direction.

The hydraulic means U can be used for swinging the clean up boom R, from the full line or operative position shown in FIGURES 7 and 10, into the inoperative position shown by the dot dash lines in FIGURE 7, and the full lines in FIGURE 8. When the operator wishes to swing the clean up boom R, independently of the main boom E, he can actuate the hydraulic means U in the manner just described. It is possible for the operator to swing the main boom E into inoperative or transporting position by directing hydraulic fluid into the cylinder 15, see FIGURE 6, for swinging the main boom E in a counterclockwise direction from the full to the dot dash line shown in FIGURE 7. The main portion of the boom E will be positioned to the left of the telescoping tower D when it is in operative position. The clean up boom R may then be swung into inoperative position where it will be in line wth the main portion of the boom E as clearly shown in FIGURE 8. The tractor A is now ready to be moved to any new location desired and the two booms E and R will not interfere with its normal travel.

When the tractor A is being used for topping trees, it moves between the two rows of trees L and M shown in FIGURE 10 and in the direction of the arrow 28. The operator has swung the main portion of the boom E into an angular position with respect to the line of travel of the tractor. It is possible for the operator to swing the boom into different angular positions. The center line for the trees 26 in the row L is shown at 29 while the center line for the trees 27 in the row M is shown at 30 in FIGURE 10. The operator in the boom seat H will swing the main boom E into a position where the angular portion of the boom will have its outermost disc saw extend beyond the center line 30 of the row M of trees, see FIGURE 7. The forward movement of the tractor A along a line mid-way between the center lines 29 and 30 in FIGURE 10, and parallel thereto will cause all of the disc saws J to top the trees 27 in the row M at points beyond the center line 30 of the trees. FIGURE 1 shows the shafts 25 provided with beaters N. The beaters are disposed above the disc saws J and just below the boom E. They are keyed to the shafts 25 and will rotate with the disc saws J and in the same direction. In FIGURES 7 and 10, the disc saws J are shown rotating in a counter-clockwise direction. They will cut the portions of the trees 27 that extend above the horizontal plane of the disc saws and the rotation of the saws plus the rotation of the beaters N will throw the cut material toward the tractor A.

Any means for rotating the disc saws J can be used. In FIGURE 1, we show endless belts 31 interconnecting pairs of pulley 32 and the pulleys are keyed to the shafts 25 and are preferably housed within the hollow boom E. Any desired operative means between the tractor engine B and the pulleys 32 may be used for rotating the shafts 25, the beaters N and the disc saws J, none being shown. Control levers 48 for effecting the operative connection of the disc saws with the engine are placed in front of the driver who occupies the tractor seat 3 and also control levers 50 are placed in front of the operator who occupies the boom seat H. Only two control levers are illustrated for each set 48 and 50, although more would be used.

We have already stated how the cut material from the trees 27 that drops upon the arcuate tractor cover F might become lodged there and additional material might create a large pile upon the top of the cover before the pile would drop off for there would be a tendency for the cut material received on the cover to move rearwardly toward the telescoping tower D as the tractor moves forwardly in the direction of the arrow 28 in FIGURES 8 and 10. We provide a roll bar indicated generally at P for removing cut material that would otherwise drop upon the tractor cover F. In FIGURE 1, we show a pair of brackets 40 and 41 that are mounted at opposite ends of the tractor cover F and are disposed midway between the sides of the cover. The brackets carry bearings 42 and 43 that in turn rotatably support the hollow cylindrical roll bar P, see FIGURE 2. FIGURES 1, 3, 4 and 7 show the roll bar P provided with two longitudinally extending ribs 44 and 45 that are welded to the outer cylindrical surface of the roll bar P and are disposed diametrically opposite to each other.

The roll bar P is rotated by a hydraulic motor Q, see FIGURES 1, 2 and 3. The latter figure indicates two hydraulic lines 46 and 47 for feeding fluid under pressure to and from the hydraulic motor. The operator occupying the seat 3 can manipulate one of the control levers 48 for feeding fluid under pressure to the hydraulic motor and the motor will rotate the roll bar P in a clockwise direction as indicated by the arcuate arrow 49 in FIGURE 4. In case the cut material jambs the roll bar P, the operator can swing the control lever 48 in the opposite direction or can actuate another control lever for rotating the hydraulic motor Q in the opposite direction. This will rotate the roll bar P counter-clockwise in FIGURE 4 and the ribs 44 and 45 will free the jammed material.

The roll bar P can be controlled by the operator in the seat H and we have indicated control levers 50 for this purpose and for controlling other operations of the various parts of the tractor.

OPERATION

Reference to FIGURE 10 will illustrate how the device operates between two parallel rows of trees L and M. The operator in the seat H, has swung the main boom E so that its disc saw carrying angular portion extends outwardly from the tractor at an angle so that the outermost disc saw on the boom will be positioned at least on the center line 30 of the row of trees M or will extend beyond this center line. The disc saws J on the main boom E will top the trees 27 from the tree portions nearest to the center line of the tractor up to the center line 30 of the trees. The operator previously has elevated the telescoping tower D so as to dispose the plane of the disc saws J at the desired distance above the ground.

The rotating disc saws J will cut tree branches that project above the plane of the saws and will tend to throw the cut branches, etc., toward the tractor. The rotating beaters N aid the disc saws in moving the cut material away from the trees and toward the passage that lies between the two rows L and M of trees. Some of the cut material may drop upon the tractor cover F and should any of this material have a tendency to pile up on the cover, the rotating roll bar P will move the material to the sides of the cover F where it will drop upon the ground. If the material should become jammed between the roll bar P and the cover F, the operator can reverse the rotation of the roll bar to disentangle the jammed material.

FIGURE 10 also shows the clean up boom in operative position. The row of disc saws T on this boom just extend to the center line 29 of the row L of trees 26. It is assumed that the tractor has already moved from right to left in this figure and that the main boom E has topped the trees 26 in the row L from the center line 29 of the trees up to the tractor. Some of the cut material from the trees 26 will have a tendency to temporarily weight down the tree branches disposed directly under them and certain of these branches may be bowed downwardly slightly during the cutting operation of the disc saws J. The result would be a freeing of the cut material from the branches by the rotating beaters N and the lifting of the bowed branches to their freed height. The tops of these freed branches might project above the cutting plane of the disc saws and a ragged top of different lengths of branches would result rather than the clean single plane cut which would be desirable.

To overcome this difficulty the clean up boom was designed to go over the tops of the tree portions previously topped by the disc saws J in the main boom. FIGURE 10 shows the clean up boom R in operative position and extending from the opposite side of the tractor from that of the main boom. The disc saws T of the clean up boom will trim any tree branches that project above the plane defined by the disc saws J of the main boom E when the tractor moved from right to left in FIGURE 10. No extra trip of the tractor between the two rows of trees L and M is necessary to effect this final trimming action of the tree tops because the clean up boom accomplishes this on the trees 26 in the row L while the disc saws J on the main boom accomplish the initial topping of the trees 27 in the row M. The operator in the seat H has individual control of the main boom E and the clean up boom R so that each of these may be swung independently of the other when it is necessary that either of them clear power poles or other obstructions that might be in the line of travel of the tractor.

After the tree topping operation is completed, the operator in the seat H may actuate the control levers 50 for swinging both the main boom E and the clean up boom R into inoperative position as shown in FIGURE 8. The disc saw J that is disposed closest to the cylindrical member D2 of the main boom E is in tree-topping position. This rotating disc saw will serve the additional purpose of cutting up any material that falls onto the cover F and moves toward the tower D because of the forward movement of the vehicle and has not been thrown laterally from the cover by the rotating roll bar. The cutting of this material by the saw will aid the roll bar P in disposing of it over the sides of the cover.

We claim:
1. In a device of the type described:
 (a) a vehicle;
 (b) a tower supported by said vehicle;
 (c) a main boom supported by said tower;
 (d) disc saws rotatably carried by said boom and having their peripheral cutting edges lying in a plane substantially paralleling the ground surface over which the vehicle travels;
 (e) means for swinging said boom to extend to one side of said vehicle for positioning its saws so that they will extend over an area that lies on one side of said vehicle;
 (f) means for rotating said saws while moving the vehicle along a row of trees for topping them;
 (g) a clean up boom pivotally supported by said main boom;
 (h) disc saws rotatably carried by said clean up boom and having their peripheral cutting edges lying in a plane substantially paralleling the ground surface;
 (i) means for swinging said clean up boom to extend to the opposite side of the vehicle from that occupied by said main boom for positioning its saws so that they will extend over another row of trees lying on said opposite side of the vehicle and substantially parallel to the first row of trees; and
 (j) means for rotating the saws of said clean up boom for causing them to top the trees of the second row.

2. The combination as set forth in claim 1: and in which
 (a) said means for swinging said main boom being adapted to move it into a travelling position paralleling the length of the vehicle; and
 (b) said means for swinging said clean up boom being adapted to swing it.

3. The combination as set forth in claim 1: and in which
 (a) a cover extends over the top of the vehicle and is positioned in front of said tower;
 (b) a roll bar rotatably supported and positioned above said cover, said roll bar extending forwardly of said tower and having its axis lying in a plane that includes the median line of said cover; and
 (c) means for rotating said roll bar for removing any debris falling on said cover that has been cut from the trees by the saws of said main and clean up booms.

4. In a device of the type described;
 (a) a vehicle;
 (b) a vertical telescoping tower supported by said vehicle and including a vertically movable and rotatable member;
 (c) a boom supported at the top of said vertically movable and rotatable member;
 (d) a row of disc saws rotatably carried by said boom and having their peripheral cutting edges lying in a plane substantially paralleling the ground surface over which the vehicle travels;
 (e) means for elevating and rotating said vertically movable and rotatable member for raising said boom and swinging it in substantially a horizontal plane for positioning said saws to extend over an area that lies on one side of said vehicle;
 (f) means for rotating said saws while moving said vehicle along a row of trees for topping them;
 (g) a cover extending over the top of said vehicle and being positioned in front of said tower;
 (h) a roll bar extending forwardly of said tower and positioned above said cover and lying substantially midway between the sides of said cover; and (i) means for rotating said roll bar for removing any debris falling on said cover that has been cut from the trees by said saws.

5. The combination as set forth in claim 4: and in which
   (a) said means for swinging said boom being adapted to swing it into a travelling position paralleling the length of said roll bar and above said cover.

6. In a device of the type described:
   (a) a vehicle;
   (b) a tower supported by said vehicle;
   (c) a main boom supported by said tower; said boom having a short portion extending radially from said tower and a long portion extending at an angle from the short portion;
   (d) a row of disc saws rotatably carried by said long portion of said boom and having their peripheral cutting edges lying in a plane substantially paralleling the ground surface over which the vehicle moves; the saw disposed nearest to said tower being positioned at the juncture where the short and long boom portions meet;
   (e) means for rotating said tower for swinging said boom from inoperative position where the long portion of the boom parallels the length of the vehicle, into operative position where the short boom portion parallels the length of the longitudinal vehicle axis and the long portion extends to one side of the vehicle;
   (f) a roll bar extending forwardly of said tower and positioned above said cover and lying substantially midway between the sides of said cover; the saw disposed nearest to said tower being positioned above said roll bar to cut any debris that moves toward said tower; and
   (g) means for rotating said roll bar for removing any debris falling on said cover that has been cut from the trees by said saws.

7. In a device of the type described:
   (a) a vehicle movable over the ground;
   (b) a cover extending over the top of said vehicle;
   (c) tree-topping means carried by said vehicle and disposed above said cover;
   (d) a roll bar mounted above said cover and disposed below said tree-topping means, the axis of said roll bar substantially paralleling the length of said vehicle; and
   (e) means for rotating said roll bar about its axis for removing any foreign material cut by said tree-topping means and dropping upon said cover.

References Cited

UNITED STATES PATENTS 3,157,016 11/1964 Leydig et al _____ 56—235
3,214,895 11/1965 Leydig et al. _____ 56—235

ABRAHAM G. STONE, *Primary Examiner.*

P. A. RAZZANO, *Assistant Examiner.*